W. S. HADAWAY, Jr.
ELECTRIC STOVE OR HEATER.
APPLICATION FILED JULY 31, 1915.
1,406,850. Patented Feb. 14, 1922.
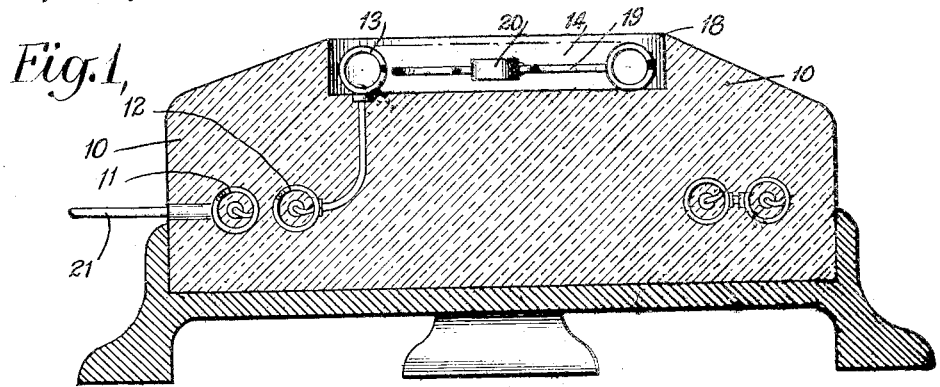
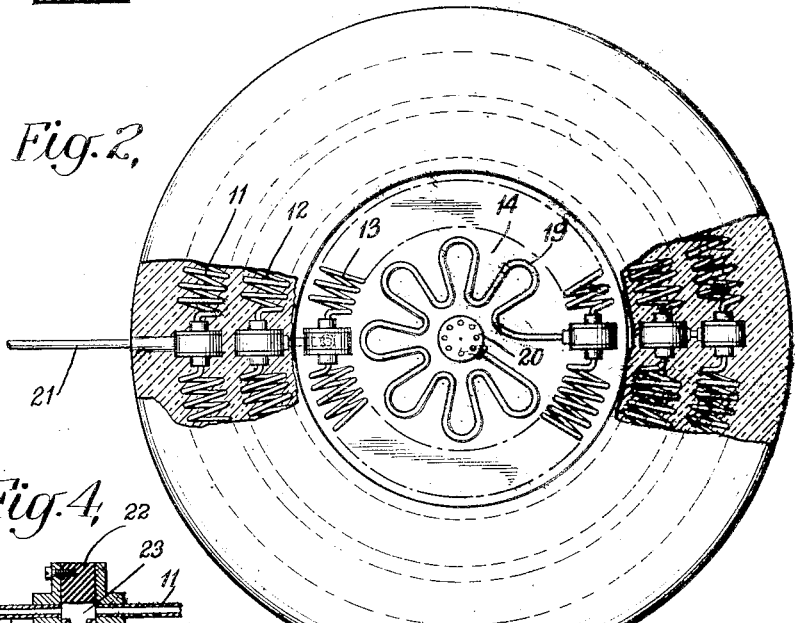
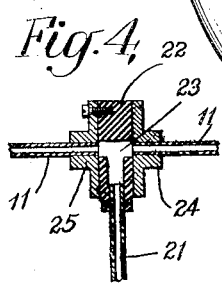
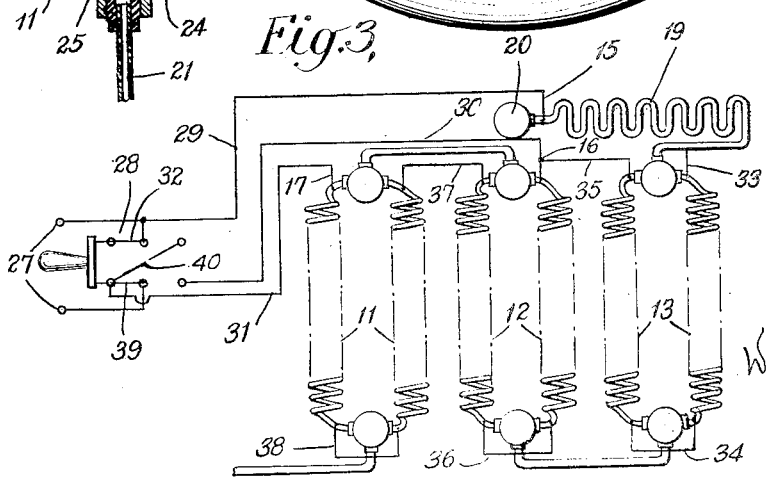
INVENTOR
William S. Hadaway Jr.
BY
ATTORNEY

UNITED STATES PATENT OFFICE.

WILLIAM S. HADAWAY, JR., OF NEW ROCHELLE, NEW YORK.

ELECTRIC STOVE OR HEATER.

1,406,850.      Specification of Letters Patent.      Patented Feb. 14, 1922.

Application filed July 31, 1915. Serial No. 42,933.

*To all whom it may concern:*

Be it known that I, WILLIAM S. HADAWAY, Jr., a citizen of the United States, and a resident of New Rochelle, Westchester County, and State of New York, United States of America, have invented certain new and useful Improvements in Electric Stoves or Heaters, of which the following is a specification.

My invention relates to electrical appliances and particularly to heating apparatus which receives its energy in whole or in part from an electric supply circuit.

One object of my invention is to provide a device of the aforesaid character that shall comprise an outlet from which hot vapor or preheated gases may be discharged and constitute a medium for directly transferring heat to the work, together with electrical means for regulating the working temperature of the vapor or gases over a wide range and for increasing their temperature to a high degree, if desired.

Another object of my invention is to provide a simple and efficient heating device that shall be adapted not only to develop useful heat, but that shall furthermore be arranged to act as a superheater, and as a dissociater, into its constituent elements of water or other vapor.

Another object of my invention is to provide an electrical device for producing a combustible gas and igniting the same.

Still another object is to provide a gas burner, an electric igniter therefor, and a dissociater combined therewith for producing a combustible gaseous mixture from water or other vapor by dissociating the same into its constituent elements.

For cooking and for various other purposes a high temperature heat is often more effective and produces more satisfactory results. Furthermore, the same results may be obtained by this means with the dissipation of less heat and at less cost.

Another object of my invention is to provide a particularly effective and efficient electric stove or heater that shall be adapted to impart its heat at a relatively high temperature.

Another object is to provide an electric stove or heater that shall concentrate an intense heat where it is most available for service, in such a manner as to preserve the integrity of the working elements and avoid injury to the same. In other words, it is one object of my invention to secure the advantages of a gas flame heater while retaining the usual advantages of an electric heater.

Another object is to provide an electric stove which shall be especially adapted to operate effectively in conjunction with a heat storage or an energy storage means.

Still another object is to provide an electric stove arranged to work at a high rate without consuming a proportionately large quantity of electric energy or requiring correspondingly large capacity in supply circuit conductors.

Another object is to simplify the control of a steam or other vapor heater by varying either the supply of vapor, the supply of electrical energy or the supply of both.

Another object is to provide a dissociation heater of the character indicated above that shall so operate as to enable a large proportion of the vapor heater to be embedded in a block of insulating material, only the dissociating element being exposed to radiation and convection.

Another object is to provide an electrical stove in which either low temperature or superheated steam is supplied for boiling water or like operations requiring large quantities of heat at low or moderate temperatures, and in which a supply of combustible gas is available for producing or assisting in the production of high temperature heat such as is required for frying or the like.

Another object is to provide a heater adapted to produce and use a gaseous fuel for the concentration of high temperature heat, the products of the fuel combustion being such as to require no ventilation and emit no noxious fumes.

Other objects and advantages of my invention will be set forth hereinafter, and in order that my invention may be thoroughly understood I will now proceed to describe the same in the following specification and then point out the novel features thereof in appended claims.

My invention may obviously be embodied in apparatus of various kinds and is adapted for various uses and the structure shown in the accompanying drawings is intended to be illustrative of one such structure.

Referring to the drawings:

Figure 1 is a transverse sectional elevation of a stove or heater constituting one embodiment of my invention. A partially sectional plan view of the same structure is shown in Figure 2.

Figure 3 is a diagrammatic view of the stove showing the vapor piping and the electric circuit connections.

A vapor connection with an electrically insulated joint is shown in section, on a large scale in Figure 4.

The structure illustrated comprises a body 10 which may be made of magnesia or an insulating block of some other suitable material, heater or superheater tubes 11 and 12, dissociater tubes 13, a vapor outlet or gas emitter 14 and electric circuit terminals 15, 16 and 17.

The body 10 is provided with a recess 18 in its upper surface, which is adapted to receive the dissociater tubes 13 and the vapor outlet of gas emitter 14, the heater or superheater tubes 11 and 12, being embedded in the body 10 of heat insulating material as clearly shown in Figure 1.

The heater tubes 11 are preferably formed of a nickel-chromium alloy or other suitable resistance material which is capable of withstanding high temperatures. Each of the tubes 11 is helical and is bent into the form of a semi-circle so that together they complete a circular figure and constitute a pair of parallel or multiple passages for the steam or vapor which is supplied to them as hereinafter explained. Electrically they may be connected in series, in series-multiple or in any suitable relation. Preferably the electrical connections are adjustable or variable to accommodate the stove to varying service conditions, as shown in the diagram of Figure 3.

The tubes 12 correspond to the tubes 11, except that they form a smaller circle concentric with that of the tubes 11 and they are connected in series relation with the tubes 11 so that steam or vapor from the outer tubes passes into the inner tubes 12 and is heated to a higher temperature therein.

From the tubes 12 the vapor passes into the dissociater tubes 13 which are similar to the tubes 11 and 12 but are disposed in the recess 18 where they constitute heat emanators and co-operate with the escaping vapor or the gas flame if the vapor has been dissociated in providing useful heat.

As its name implies, each dissociater tube is adapted to dissociate the superheated vapor supplied to it and to deliver a combustible gas mixture to the gas emitter 14. This emitter comprises a resistance tube 19 through the pores of which a portion of the gas may escape.

The desired working temperatures may be obtained without dissociation and the vapor discharged from the outlet in a more or less highly superheated condition as regulated and governed by varying the electrical energy translated in the tubes which are electric heaters as well as vapor carriers.

The emitter or outlet member 14 has a zigzag circular form and is connected at one end to the dissociater tubes 13, a discharge nozzle or burner 20 being provided at its opposite end.

The parts 13, 19 and 20 are adapted to be maintained at a relatively high temperature such as 950°–1000° C. and the combustible gas formed by the dissociation of water vapor for example, will be readily ignited as fast as it escapes from the stove.

The steam connections are established from a supply pipe 21 by any suitable means to the tubes 11 and between the tubes 11 and 12 and the tubes 12 and 13. It is, of course, essential that many of the steam connections be provided with electrical insulating joints in order that the steam passages may be connected in any desired manner without interfering with the establishment of any suitable electrical connections. A simple form of insulated steam connection is shown in Fig. 4 and comprises an insulating block 22 with a three-way passage 23, and metal collars 24 and 25, which are adapted to receive the adjacent ends of one pair of resistor tubes such as the tubes 11 for example.

The steam and electrical connections may obviously be arranged in various ways of which one is illustrated in Figure 3.

Referring to this figure; 27 indicates a supply circuit, 28 a control switch and 29, 30 and 31 conductors which connect the terminals 15, 16 and 17 to the control switch.

With the control switch 28 in the position illustrated, a circuit is established by switch blade 32 from one side of the supply circuit 27 through conductor 29, the emitter tube 19, a conductor 33, the resistor tubes 13 (which are joined by a connecter 34) a connecter 35, resistor tubes 12 (which are joined by connecter 36) a connecter 37, resistor tubes 11 (which are joined by a connecter 38) conductor 31 and switch blade 39 to the opposite side of the supply circuit.

When the control switch 28 is thrown into its opposite position, the terminal 15 is still connected to one side of the supply circuit through the conductor 29. The terminal 17 is connected through conductor 31, a connecter 40 and switch blade 32 to the same side of the supply circuit while the intermediate terminal 16 is connected through the conductor 30 and the switch blade 39 to the opposite side of the supply circuit, thus the resistor tubes are connected in a series-multiple relation.

The operation of the device is as follows: Assuming that low temperature steam is supplied through the pipe 21 from a boiler, the exhaust of an engine or some other suitable source, it will pass through the tubes 11, through the tubes 12 then through the tubes 13 and finally, through the gas emitting tube 19, escaping through the small openings (see Fig. 2) in the nozzle or burner 20. If heat at low temperature is desired no electric energy is used, the amount of electric energy being easily varied and determined by the requirements of each case. The electric circuit is established by closing the switch 28, and the electric energy is translated into heat in the resistor tubes. This heat is largely prevented from escaping by reason of the heat insulating body 10, of which the stove is comprised and is given up to the steam within the tubes. The temperature of the steam is therefore materially raised by successive steps as the steam traverses successively the tubes 11, 12 and 13. In fact, if high working temperatures are desired the steam enters the tube 13 at a relatively high temperature and a large part of the heat generated in these tubes is available for use directly for cooking or like purposes. It is for this reason that the tubes 13 are not embedded in the insulating body, but are mounted in such a way as to radiate the heat.

Not only is the vapor temperature elevated in successive steps but the temperature of the resistor from its vapor inlet to its vapor outlet end is elevated by the temperature of the vapor which temperature is superposed upon the heat developed electrically within the resistor.

Attention is directed to the fact that the resistor tubes 11 and 12 keep the insulating body 10 at a temperature, which is materially higher than that of the surrounding air and consequently the loss of heat from the high temperature tube 13 due to the close proximity of the body 10 is materially lessened. In fact, the insulating body, which is heated, serves as a booster to increase the temperature of the resistor tubes. The peculiar relation between the heat insulating body and the working member is more fully brought out in my co-pending application, Serial No. 42,934 filed of even date herewith.

The electrical resistance of the gas emitter 19 is preferably such that the superheated steam which is supplied to it from the tubes 13 is dissociated into its elemental constituents when the full current electric connections are established.

The hydrogen and oxygen thus produced constitute a combustible mixture and are extremely active so that a certain amount of the gas may pass through the pores of the metal of which the emitter is composed and the remainder escapes through the small openings in the nozzle or burner 20.

As already explained, the temperature of the parts 13, 19 and 20 is so high as to immediately ignite the gas, producing a very hot flame.

My invention is not limited to an arrangement in which steam is dissociated and ignited as other vapors may be utilized.

Furthermore, while the apparatus may be used as a dissociater it may, if desired, be used merely as a gas producer or as a superheater, in which case the superheated vapor escapes from the nozzle 20.

The regulation of the heat generated in the device may be readily effected by merely governing the amount of electrical energy supplied; for example, in utilizing the heater for cooking a very intense heat may be obtained initially by supplying a large quantity of electric energy to the heater and under these conditions the dissociater will act as above explained. Later, when less heat is required, the amount of electric energy may be reduced and under these conditions the dissociater may be inactive and the apparatus operate merely as a superheater. If still less heat is required the electric energy may be cut off entirely when the low pressure steam will alone serve to impart the heat to the device.

The stove or heater construction of my invention may advantageously be used in a furnace or for heating crucibles where high and uniformly diffused temperatures are required. It is also well adapted for use in singeing operations where the conditions demand a high temperature flame under accurate control.

While I now consider the tubular form of resistor shown and described to be preferable, my invention is not limited in this regard and the resistor may be formed in any suitable manner. For example, a passage of annular cross section may be formed by mounting two heat resisting tubes of insulating material such as fused quartz, one within the other and inserting a resistor helix in the passage. The temperature of the heating medium emitted is of course dependent not only upon the electric energy supplied but also upon the temperature of the steam or other vapor supplied to the apparatus, and this temperature may alone be varied or both the steam temperature at the source and the electric energy may be varied.

It is evident that a wide range of working temperatures is readily available.

It is therefore evident that structural variations may be effected within the spirit and scope of my invention and as already pointed out the electrical connections may be materially changed. I therefore intend that only such limitations be imposed as are indicated in the appended claims.

What I claim is:

1. A heater comprising a gas emitter, a tubular resistor connected thereto and adapted to receive water vapor, and means for supplying electric energy to the resistor.

2. A heater comprising an insulating body, tubular resistors of circular helical form, a gas emitter connected to the resistors and adapted to be supplied with superheated vapor therefrom, said tubular resistors being adapted to be supplied with low temperature vapor.

3. A heater comprising an insulating body, a tubular resistor in helical form embedded in the insulating body, a gas emitter connected to be supplied with superheated steam from the tubular resistor.

4. A dissociater comprising an insulating body, a tubular resistor in helical form embedded in the insulating body, a nozzle or burner for the dissociated gas and an interposed resistor tube adapted to dissociate the superheated vapor received from the helical resistor.

5. A dissociater comprising a tubular resistor having a gas outlet at one end and an inlet for $H_2O$ at the opposite end.

6. A dissociater comprising a tubular resistor having a gas outlet at one end and an inlet for $H_2O$ at the opposite end, and means for supplying electric energy to the resistor tube.

7. A dissociater comprising an insulating body having a recess in its upper surface, a tubular resistor in helical form disposed in the recess, a burner connected to the tubular resistor and adapted to be supplied with a gas mixture therefrom, said tubular resistor being adapted to be supplied with $H_2O$ at its outer end.

8. A heater comprising a plurality of tubular resistor units connected to form a succession of vapor passages and means for insulating certain of the resistor units against external radiation whereby the heat generated therein is largely absorbed by the vapor.

9. A heater comprising a plurality of tubular resistor units connected to form a succession of passages and adapted to be supplied with steam and means for insulating said units against external radiation, said insulating means constituting a support for the working member.

10. A stove comprising a body of insulating material, a tubular resistor constituting a working member mounted thereon and a plurality of tubular resistors embedded in the insulating body, connected to the working member and adapted to superheat vapor, and deliver the same to the working member.

11. A stove, comprising a body of insulating material having a recess in the top, a tubular resistor supported in the recess and constituting the working member and a plurality of tubular resistors embedded in the insulating body and connected to the working member.

12. A dissociater comprising a gas emitter, a body having a vapor passage therein, electro-responsive means for heating the passage, said passage being connected to the emitter and adapted to receive water vapor.

13. A dissociater comprising an insulating body, having a vapor passage therein, a gas emitter mounted on the body, an electro-responsive means for heating the passage, said passage being adapted to be supplied with water vapor and to deliver superheated vapor to the emitter.

14. A heater comprising an osmotic emitter, means for supplying highly superheated vapor thereto, and means for supplying additional heat to the emitter.

15. A heater comprising an osmotic emitter, means for supplying highly superheated vapor thereto, and means for supplying electric energy to the emitter, whereby the electric energy is translated into heat in the emitter.

16. A heater comprising an osmotic emitter, an insulating body associated therewith and having a passage connected to the emitter, and means for heating the passage to the emitter.

17. A heater comprising an osmotic emitter, an insulating body associated therewith and having a passage connected to the emitter, and means for electrically heating the passage to the emitter, whereby the emitter receives heat from the passage and from the translation of electric energy in the emitter.

18. A heater comprising an osmotic emitter, means for supplying hot vapor thereto, and means for supplying additional heat to the emitter to dissociate the vapor therein.

19. A heater comprising an osmotic emitter, means for supplying hot vapor thereto, and means for supplying electric energy to the emitter to dissociate the vapor therein.

20. A heater comprising a vapor nozzle or gas emitter, a member having a heated passage connected thereto, and means for regulating heat applied to the passage to determine the temperature of the vapor emitted from a relatively low degree to a temperature at which the vapor is dissociated.

21. A heater comprising a gas emitter having a discharge opening adapted to concentrate heat at a small area, a vapor tube connected to the emitter, means for imparting heat to the vapor tube, and means for supplying preheated gas to the vapor tube.

22. A heater comprising an insulating body, and a tubular resistor, partially exposed at the surface of the body and partially imbedded in the body.

23. A stove comprising a body of insulating material, a tubular resistor having an exposed section on the top of the insulating body, and a section connected to the exposed section but imbedded in the body.

24. A heater comprising a supporting member having an upstanding flange constituting a shallow receptacle, an insulating body fitted into the support, and a tubular resistor composed of a section imbedded in the insulating body and an exposed section mounted on the top of the insulating body.

25. A heater comprising a supporting member having an upstanding flange constituting a shallow receptacle, an insulating body fitted into the support and having a recess at the top, a tubular resistor composed of an exposed section located in the recess in the top of the insulating body, and a section connected thereto and imbedded in the insulating body.

26. The method of heating that consists in discharging highly heated gas from a heat radiant nozzle, whereby heat is transferred from the nozzle by radiation and convection.

27. The method of heating that consists in discharging highly superheated steam against the work at high velocity.

28. The method of heating that consists in discharging highly superheated steam from a high temperature nozzle against the work, whereby heat is transferred to the work from the nozzle by radiation and by convection.

29. A heater comprising a discharge member from which gases are emitted and combined to produce heat, and a high temperature glowing body to which heat is electrically supplied, near the discharge member.

30. A heater comprising a gas discharge member from which gases are emitted to produce combustion, and a high temperature glowing mass in which heat is electrically generated near the discharge member.

31. A heater comprising a gas emitter adapted to act as a combustion heater and an electrically heated high temperature member adapted to supplement the combustion heater and adapted to operate at a glowing temperature.

32. A heater comprising a gas discharge member adapted to produce heat by combustion, in combination with a radiant high temperature heating member which is supplied with electrically generated heat.

33. A heater comprising a gas discharge member adapted to produce heat by combustion, in combination with a radiant high temperature heating member in which the heat is electrically generated.

34. A heater comprising an insulating body, a tubular resistor partially exposed at the surface of the body and constituting a radiant heater and partially imbedded in the body, and constituting a heater, a gas emitter connected to the tubular resistor adapted to discharge combustible gases, whereby the heat of combustion is combined with the heat radiated from the radiant portion of the tubular resistor.

35. The method of heating that consists in passing gas through a passage to which heat is applied and discharging it through a highly heated nozzle at high temperature against the work, whereby heat is transferred from the nozzle by radiation and convection.

In witness whereof, I have hereunto set my hand this 28th day of July, 1915.

WILLIAM S. HADAWAY, Jr.